Sept. 22, 1964 J. BERGMANN ETAL 3,149,443
DEVICE FOR ABRADING AND POLISHING IN PARTICULAR
CURVED-SURFACES OF GLASS OBJECTS
Filed Aug. 7, 1962 2 Sheets-Sheet 1

INVENTORS
JOSEF BERGMANN
GUNTHER ENGELS
BY
AGENT

Sept. 22, 1964       J. BERGMANN ETAL       3,149,443
        DEVICE FOR ABRADING AND POLISHING IN PARTICULAR
                CURVED-SURFACES OF GLASS OBJECTS
Filed Aug. 7, 1962                        2 Sheets-Sheet 2

INVENTORS
JOSEF BERGMANN
GUNTHER ENGELS
BY
AGENT 3,149,443
DEVICE FOR ABRADING AND POLISHING IN PARTICULAR CURVED-SURFACES OF GLASS OBJECTS
Josef Bergmann and Günther Engels, Aachen, Germany, assignors to North American Philips Company, Inc., New York, N.Y., a corporation of Delaware
Filed Aug. 7, 1962, Ser. No. 215,356
Claims priority, application Germany Sept. 28, 1961
10 Claims. (Cl. 51—196)

The invention relates to a device for abrading and polishing in particular curved surfaces of glass objects for example the screens of cathode ray tubes, which device comprises a resilient disc shaped carrier, which on one side is provided with abrading or polishing means and which on the other side is provided with means for applying a load distributed evenly over substantially the whole of said other side of the carrier.

In a prior application the resilient carrier is provided with an annular, tubular container filled with loading material, which container must be secured by chains or the like to the driving member of the carrier, since otherwise it would be excessively deformed in operation. This device yields good results.

The device of the kind set forth may, however, be further improved in deriving the load from a preferably annular loading plate which, with the interposition of a gas-or liquid filled, preferably an annular container 11 of a material such as rubber or the like rests on the elastic carrier. Thus, a still more uniform distribution of the operative pressure on the surface to be worked can be attained, so that a very uniform abrasion of the material is obtained.

The loading plate may be arranged so as to be displaceable in the direction of the rotary axis of the carrier. In this case the loading plate bears with its own weight on the gas or liquid-filled container which distributes the pressure uniformly over the elastic carrier and from there over the surface to be worked. The loading plate must then be comparatively heavy and thick. In this case it is preferred to have the driving member of the resilient carrier to bear via pressure springs on the loading plate.

In a further embodiment of the invention the driving member of the elastic carrier bears directly on the loading plate. The driving member exerts directly a force on the loading plate, which in turn distributes this force via the gas or liquid-filled container over the resilient carrier and hence over the surface to be worked in a uniform manner. With this embodiment the loading plate may be comparatively light and thin.

It is efficaceous that the annular container has a cross section which matches the curvature of the surface of the object to be treated. The cross section is preferably trapezoidal.

In order to avoid the possibility that the driving member exerts an excessive pressure on the center of the resilient loading plate, the latter has a recess in the region of its driving member, in which recess the driving member is resiliently mounted.

The invention will now be described more fully with reference to a few embodiments shown in the drawing.

Figure 1:
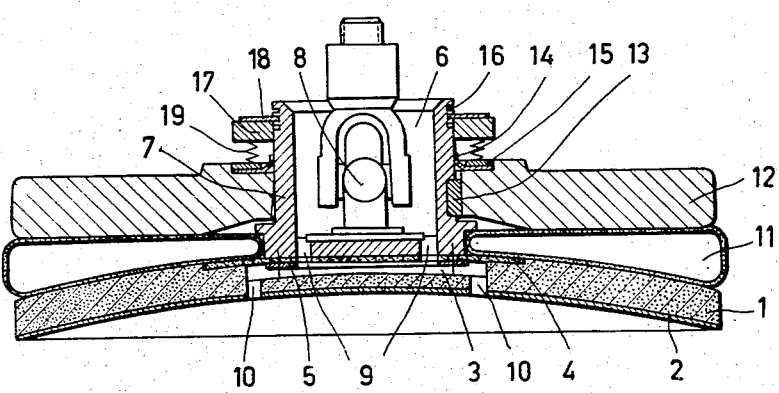
FIGS. 1 and 2 show in sectional views two embodiments of the abrading and polishing device according to the invention for working curved faces.

With the abrading and polishing device shown in FIG. 1 a circular carrier 1 for the abrading or polishing plates 2 consists of a resilient material, for example foam rubber or foam plastics. The carrier 1 has, at the center on the side remote from the abrading and polishing plates, a circular recess 3, which is covered by a thin disc 4 connected at the edge with the carrier 1 and also made from resilient material, for example a thermoplastic synthetic substance. By means of screws (not shown) and a metal ring 5 the driving member 6 of the carrier 1 is secured to said disc 4. The driving member 6 comprises a sleeve 7, the bottom of which has a cardanic joint 8 for the driving gear (not shown). Via the cardanic joint 8 and the sleeve 7 the rotation performed by the driving member is transferred to the carrier 1. Various openings 9, 10 are provided in the bottom of the sleeve 7, in the disc 4 and in the carrier 1. An abrading and polishing fluid can be fed through said openings at the upper end of the sleeve 7.

On the carrier 1 is loosely disposed a gas- or liquid-filled, for example air-filled rubber ring 11, the cross section of which is, in this case, trapezoidal, so that the ring matches the curvature of the carrier for working curved surfaces. The sleeve 7 fixes the position of the rubber ring 11. On the ring 11 bears an annular loading plate 12 of iron or a similar material, which is held by means of a member 13 and the rotating sleeve 7 and is displaceable in the direction of the axis of rotation. The weight of the loading plate 12 is uniformly distributed via the air-filled ring 11 over the carrier 1, so that the latter can exert a uniform operative pressure on the surface to be treated, which is conducive to a uniform abrasion of the object to be worked on.

In order to prevent the penetration of the abrading and polishing liquid from the outer side there is provided a rubber insert 14, which is held by a ring 15.

The upper edge of the sleeve 7 is provided with a few circular grooves 16. An annular metal disc 17 is slipped onto the sleeve 7. The one side of said disc 17 is held in contact with a safety ring 18 arranged in a groove 16. The opposite side of the disc 17, together with the whole driving member 6, rests via a number of pressure springs 19 on the loading plate 12. With the ring 18 the spring action can be adjusted. Thus an excessive pressure of the sleeve 7 on the resilient carrier 1 can be avoided. However, if the sleeve 7 would press too far downwardly, it arrives in recess 3 on the upper side of the carrier 1, so that the sleeve 7 is prevented from abutting against the carrier 1 and thus a considerable variation in the pressure distribution is avoided. The sleeve 7 is urged back by the spring 19 out of the recess 3.

Figure 2:
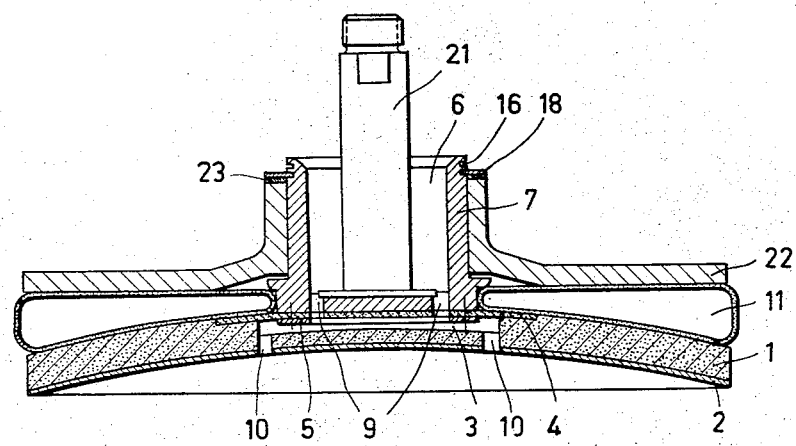

The device shown in FIG. 2 is constructed in a manner similar to that of the device of FIG. 1. Similar parts are designated by the same reference numerals. Instead of the cardanic joint use is made of a rigid driving shaft 21. The loading plate 22 is considerably thinner and lighter. The loading plate 22 bears, if desired with the interposition of a seal 23, directly on the safety ring 18 of the driving member 6. Thus the driving member exerts via the driving shaft 21, the sleeve 7 and the ring 18 a pressure on the loading plate 22, which pressure is uniformly distributed over the carrier 1 by means of the air-filled ring 11. Consequently, by means of a greater or smaller load of the driving member, the operative pressure can be adjusted at will.

Figure 3:
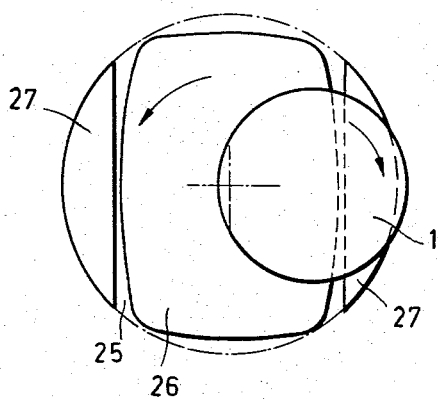
FIGS. 3 and 4 are a plan view and a side elevation of an abrading or polishing device according to the invention for working the display screen of a television tube.
Figure 4:
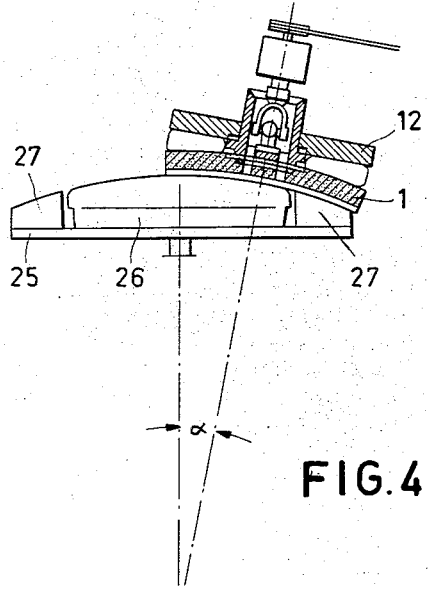

As shown in FIGS. 3 and 4 a glass display screen 26 of a television tube is disposed on a rotatable table 25; the surface of said screen has to be abraded or polished by means of the device shown in FIG. 1. The table 25 and the carrier 1 are rotated in opposite directions, which is indicated in FIG. 3 by arrows. The axis of rotation of the abrading and polishing device is at an angle $\alpha$ to the axis of rotation of the table 25, so that the same operative pressure is exerted on each point of the overall surface of the display screen 26. Since due to the mainly rectangular shape of the display screen 26 the carrier 1 extends partly beyond the edge of the display screen 26, supports 27 for example of hard material may be disposed, if necessary, on the table 25 along the long sides of the display screen 26, said supports enlarging so to say the surface of the face to be worked.

What is claimed is:

1. A device for abrading and polishing objects having a curved glass surface comprising a resilient disc-shaped carrier being provided on one side with an abrading and polishing means and provided on the opposite side with a means for applying a load distributed evenly over substantially the entire surface of said opposite side of said carrier, said means for applying a load including an annular loading plate and a hollow container, the latter being filled with a fluid substance, said hollow container being constituted of a resilient material and resting on said disc-shaped carrier, and said annular loading plate having a surface engaging substantially the entire adjacent surface of said hollow container.

2. A device for abrading and polishing objects having a curved glass surface as claimed in claim 1 further comprising means for displacing said carrier in the direction of the rotational axis of said carrier.

3. A device for abrading and polishing objects having a curved glass surface comprising a resilient disc-shaped carrier being provided on one side with an abrading and polishing means and provided on the opposite side with a means for applying a load distributed evenly over substantially the entire surface of said opposite side of said carrier, said means for applying a load including an annular loading plate and a hollow container, the latter being filled with a fluid substance, said hollow container being constituted of a resilient material and resting on said disc-shaped carrier, and said annular loading plate having a surface engaging substantially the entire adjacent surface of said hollow container, and a driving member for said carrier, pressure springs, said driving member engaging said loading plate through said pressure springs.

4. A device for abrading and polishing objects having a curved glass surface comprising a resilient disc-shaped carrier being provided on one side with an abrading and polishing means and provided on the opposite side with a means for applying a load distributed evenly over substantially the entire surface of said opposite side of said carrier, said means for applying a load including an annular loading plate and a hollow container, the latter being filled with a fluid substance, said hollow container being constituted of a resilient material and resting on said disc-shaped carrier, and said annular loading plate having a surface engaging substantially the entire adjacent surface of said hollow container and a driving member for said carrier, said driving member resting directly on said loading plate.

5. A device for abrading and polishing objects having a curved glass surface as claimed in claim 1 wherein said hollow container has a bottom surface which assumes the curvature of the glass surface to be treated.

6. A device for abrading and polishing objects having a curved glass surface as claimed in claim 5 wherein the cross section of said hollow container is trapezoidal.

7. A device for abrading and polishing objects having a curved glass surface as claimed in claim 5 wherein said carrier is provided with a recess and further comprising a driving means which resiliently engages in said recess.

8. A device for abrading and polishing objects having a curved glass surface comprising a resilient disc-shaped carrier being provided on one side with an abrading and polishing means and provided on the opposite side with a means for applying a load distributed evenly over substantially the entire surface of said opposite side of said carrier, said means for applying a load including an annular loading plate and a hollow container, the latter being filled with a fluid substance, said hollow container being constituted of a resilient material and resting on said disc-shaped carrier, and said annular loading plate having a surface engaging substantially the entire adjacent surface of said hollow container, and means for rotating said object to be treated and said carrier, the rotation of said object to be treated and said carrier being in opposite directions.

9. A device for abrading and polishing objects having a curved glass surface as claimed in claim 8 wherein the rotary axis of said carrier is positioned obliquely relative to the rotary axis of said object to be treated.

10. A device for abrading and polishing objects having a curved glass surface as claimed in claim 8 further comprising supports located along the sides of the object to be treated, said supports forming an extension of said curved glass surface.

References Cited in the file of this patent

UNITED STATES PATENTS

| | | |
|---|---|---|
| 2,164,418 | Monnet | July 4, 1939 |
| 2,189,472 | Peterson | Feb. 6, 1940 |
| 3,050,909 | Rawstron | Aug. 28, 1962 |